United States Patent [19]
Kizer et al.

[11] Patent Number: 5,498,085
[45] Date of Patent: Mar. 12, 1996

[54] SHAFT SEALING SYSTEMS

[75] Inventors: Thomas L. Kizer, Farmington Hills; Lawrence C. Boczar, Warren, both of Mich.

[73] Assignee: Chrysler Corporation, Highland Park, Mich.

[21] Appl. No.: 357,571

[22] Filed: Dec. 15, 1994

[51] Int. Cl.⁶ ................................................. F16C 33/46
[52] U.S. Cl. ........................ 384/484; 384/477; 384/572
[58] Field of Search ............................. 384/477, 484, 384/523, 572, 534, 575

[56] References Cited

U.S. PATENT DOCUMENTS

| | | | |
|---|---|---|---|
| 2,856,246 | 10/1958 | Gaubatz | 308/187.2 |
| 2,858,176 | 10/1958 | Thompson | 308/187.1 |
| 4,655,618 | 4/1987 | Labedan et al. | 384/486 |
| 4,895,215 | 1/1990 | Rives | 384/572 |
| 4,960,334 | 10/1990 | Mazziotti | 384/523 |
| 4,974,973 | 12/1990 | Janeke | 384/484 |
| 5,096,207 | 3/1992 | Seeh et al. | 277/35 |
| 5,368,397 | 11/1994 | Freiwald | 384/130 |

Primary Examiner—Lenard A. Footland
Attorney, Agent, or Firm—Christopher A. Taravella

[57] ABSTRACT

A sealing system for a rotating shaft journaled in roller, ball or tapered bearings retained in a carrier includes an outer seal which sealingly engages the carrier and an inner seal which sealingly engages the shaft. In this way, the sealing velocity is substantially lowered for a shaft of a given diameter enhancing the integrity of the seal over a greater range of shaft diameters and speeds.

13 Claims, 3 Drawing Sheets

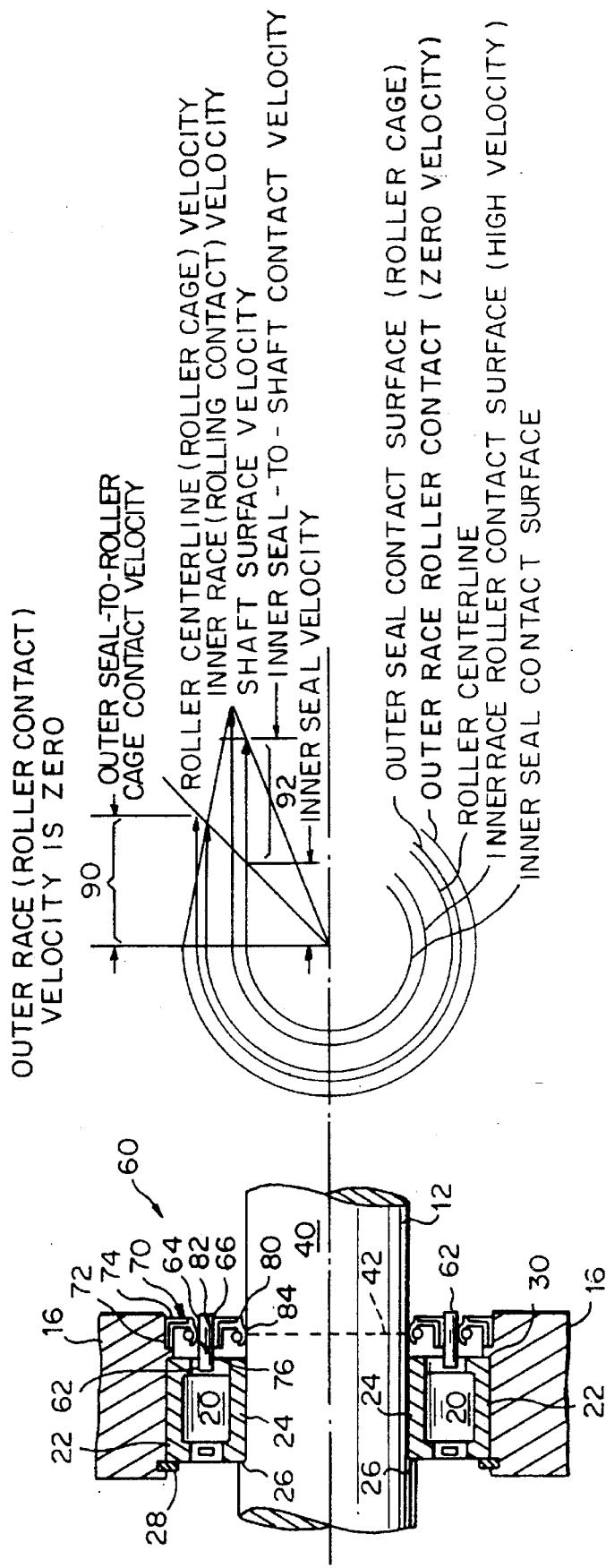

SHAFT SEALING SYSTEMS

The present invention relates to improvements in shaft sealing systems. More particularly, the present invention relates to improvements in shaft sealing systems for rotary shafts mounted in rolling bearings.

BACKGROUND OF THE INVENTION

In some mechanical systems, rotating shafts are required to transmit high levels of torque at low rotational speeds and yet must still be capable of rotating at high speeds with reduced torque. An example of such a requirement is in high speed electric motors utilized in automotive coolant systems in which shaft seals are used to isolate coolant liquid from shaft support bearings while retaining lubricant within the bearings. In this situation, if coolant liquid is able to mix with lubricant, the lubricant is degraded, which can eventually result in bearing failure.

In a typical shaft, housing, bearing and seal arrangement, the seal is mounted directly on the housing with the seal-to-shaft contact point, or line, on the surface of the rotating shaft. Maximum shaft speeds for effective seal performance depend on conditions such as shaft surface finish, temperature, eccentricity, seal type, lubricants or other fluids present as well as a number of other parameters. With respect to these conditions, surface speed at the contact point between the seal and shaft is more meaningful to the function of the seal than the rotational speed of the shaft. Surface speed is directly proportional to shaft diameter.

The minimum diameter of drive shafts used in such systems is primarily a function of the maximum torque to be transmitted regardless of the speed of the shaft, If a shaft has a high speed mode as part of its operating cycle, sealing considerations become a factor as diameters are increased to accommodate higher torque.

The maximum contact point speed for commonly used high speed lip seal materials and designs is specified by Federal Mogul for its lip seals to be 3,000 feet per minute. Exemplary of a set of conditions that would result in a contact speed of 3,000 feet per minute is a one-inch diameter shaft rotating at 11,500 rpm. A higher rotational speed, or a larger diameter shaft, results in a seal-to-shaft contact speed higher than 3000 FPM and could result in less than satisfactory seal performance and durability or seal failure.

SUMMARY OF THE INVENTION

It is a feature of the present invention to provide new and improved shaft sealing systems for rotating shafts.

The present invention is directed to a sealing system for a rotating shaft mounted in rolling bearings, wherein the rolling bearings have a bearing cage which rotates as the shaft rotates and as the rolling bearings revolve with respect to a support mounting the shaft and rolling bearings. The system is improved by an outer seal and an inner seal. The outer seal is fixed to the support and has sealing engagement with the bearing cage while the inner seal is fixed to the bearing cage for rotation therewith and has sealing engagement with the shaft.

In accordance with various aspects of the invention, the rolling bearings may be roller bearings, ball bearings or tapered bearings.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is a side elevational view of a shaft sealing system configured in accordance with the present invention;

FIG. 4 is a view similar to FIG. 2 showing for FIG. 3 shaft surface velocity as a function of seal contact velocity, as well as a function of various other, co-plotted parameters;

DETAILED DESCRIPTION

Figures 1, 2:
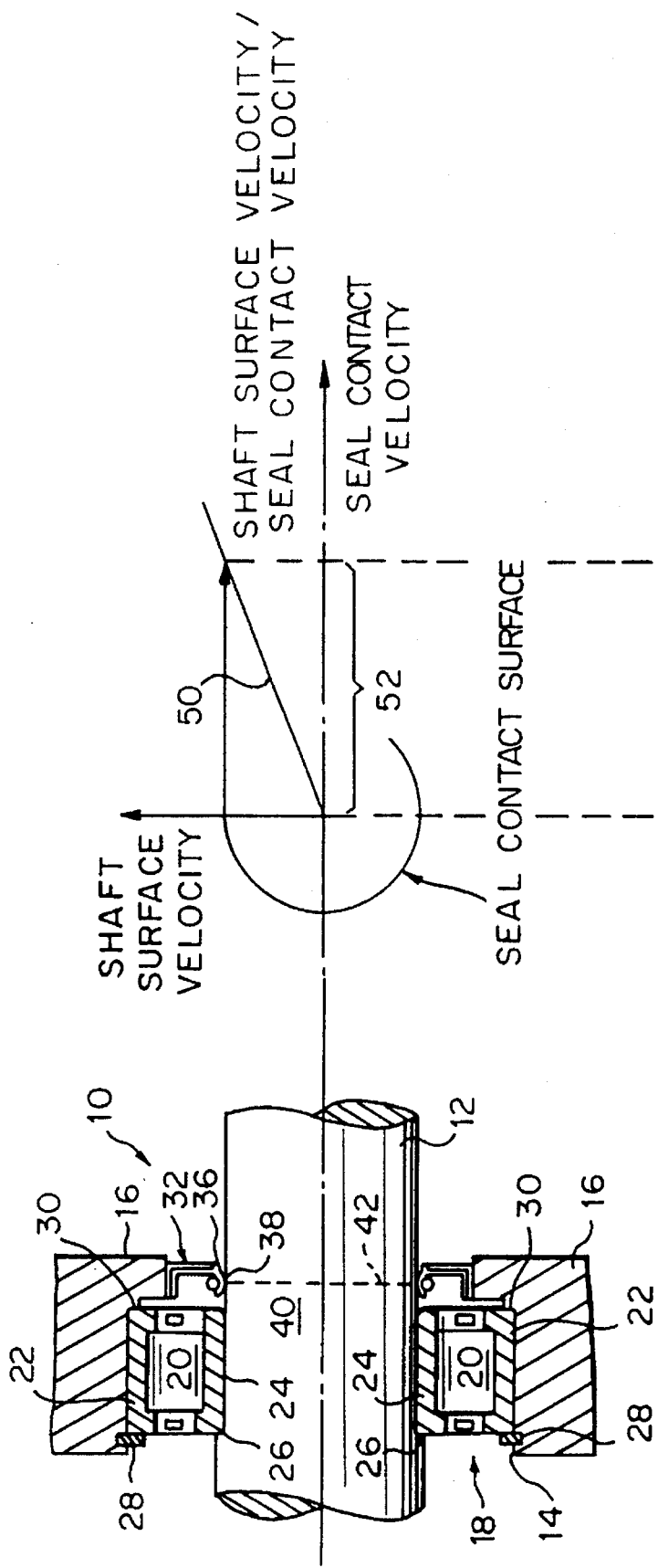
FIG. 1 is a side elevational view of a conventional, prior art, shaft sealing system.
FIG. 2 is a graph depicting shaft surface velocity as a function of seal contact velocity for the system of FIG. 1.
Figure 5:
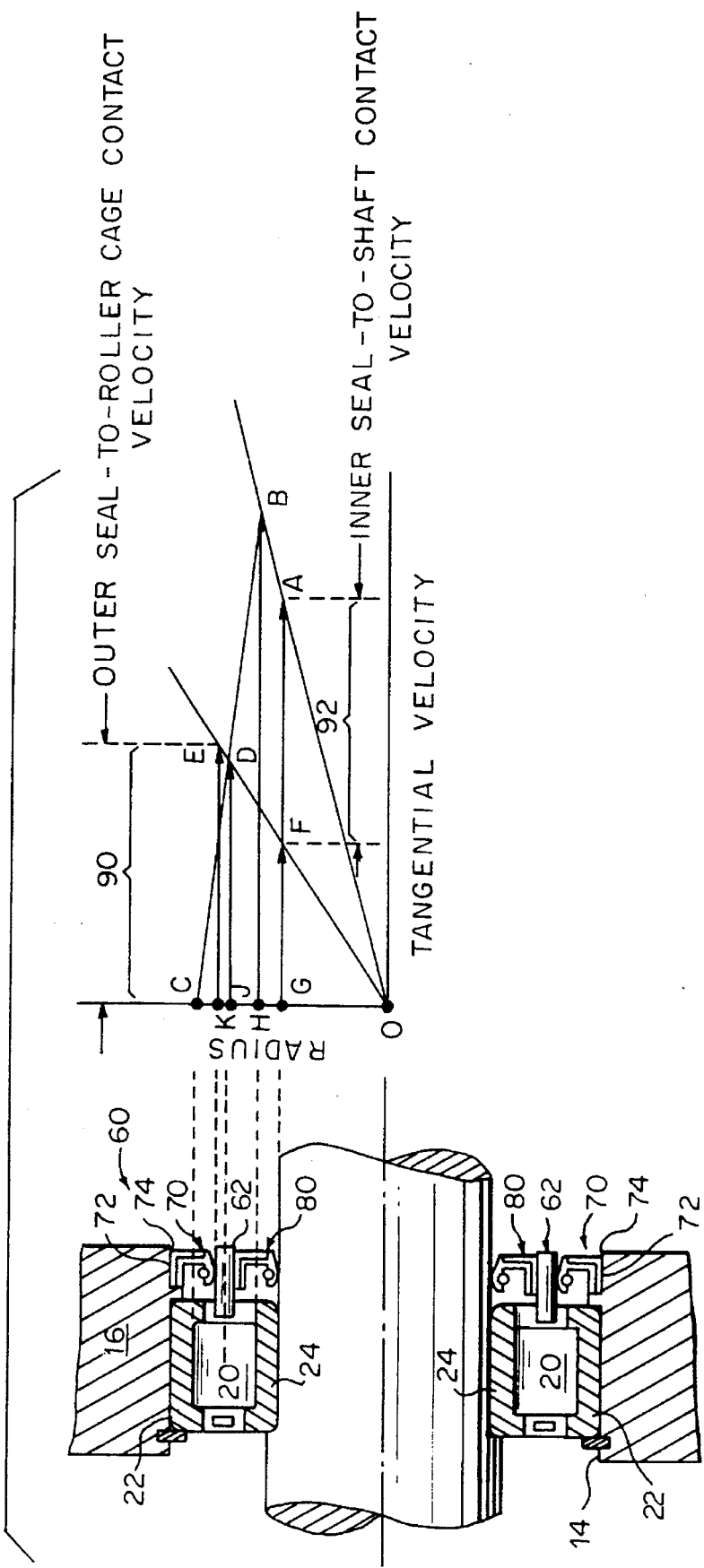
FIG. 5 is a view similar to FIG. 3 showing the shaft seal system in accordance with the present invention aligned with a graph which plots shaft radius as a function of tangential velocity.

FIGS. 1 and 2 are directed to a conventional, prior art, shaft seal system, a discussion of which highlights the contribution of the new and improved shaft system set forth in FIGS. 3–5. In the conventional shaft seal system 10 a shaft 12 may be driven to rotate by an electric motor (not shown). Shaft 12 may be utilized in a mechanical system in which the shaft is required to transmit high levels of torque at low rotational speeds while being capable of rotating at high speeds with reduced torque. As has previously been set forth, such a shaft is used to drive pumps in coolant systems employed in automotive vehicles.

The shaft 12 is supported in opening 14 in a wall 16 which might, for example, be the wall of an electric motor or the wall of a pump (not shown). Disposed in the opening 14 is a bearing 18, which in this disclosure is a roller bearing comprised of a plurality of rollers 20. While rollers 20 are illustrated, the bearings may be ball bearings or tapered bearings. The roller bearings 20 are mounted between an outer race 22, which contacts the surface of the hole 14 and inner race 24, which contacts the shaft 12. The inner race 24 abuts an annular shoulder 26 of the shaft while the outer race is axially retained within the opening 14 in the housing 16 by an annular spring retainer 28 and shoulder 30.

In order to seal the bearing 18 from the external environment, a seal 32 has one end 34 fixed to the housing 16 and a sealing end 36 with a seal contact 38 engaging a surface 40 of the shaft 12 along a sealing contact area or line 42.

Referring now to FIG. 2, it is seen that with the arrangement of FIG. 1 the seal contact velocity as a function of the shaft surface velocity is a straight line 50, having a magnitude 52.

Referring now to FIGS. 3–5, there is shown a sealing system 60 configured in accordance with the principles of the present invention. The sealing system 60 is used in lieu of the prior art seal 32 of FIG. 1. In the sealing system 60, a bearing cage 62 keeps the roller bearings 20 spaced from one another and rotates around the shaft 12 as the bearings revolve and the shaft 12 rotates. The bearing cage 62 has an outer surface 64 and an inner surface 66. The outer surface 64 forms a cylindrical sealing surface which is engaged by an outer seal 70 which has an outer end 72 fixed to the surface of an opening 74 in the wall 16 of the housing and a sealing surface 76 which engages the outer surface 64 of the roller cage 62.

An inner seal 80 has one end fixed to the inner surface 66 of the roller cage 62 and a sealing surface 84 which engages the surface 40 of the shaft 12 along the sealing contact area or line 42 (which, for purposes of velocity considerations includes the contact point).

In essence, by extending the roller cage 62 in the axial direction, the inner seal 80 is fixed to the extended roller cage which provides a seal-to-shaft contact point or line 42 at the surface 40 of the shaft 12. The outer seal 70 has a contact point on the outer surface 64 of the extended roller cage 62. Consequently, the outer surface 64 of the roller cage 62 acts as the "shaft" surface for the outer seal 70. Accordingly, if the outer race 22 of the bearing 18 is stationary within the housing wall 16, the rotational speed of the bearing roller cage 62 is always less than that of the shaft 12 supported in the bearing. By using a bearing roller cage 62 as both an outer seal contact point and inner seal carrier, the seal 80-to-shaft 12 and seal 70-to-cage 62 contact speed is less than that of the single seal 32 installed on a shaft of the same diameter using the conventional arrangement of FIG. 1.

These lower velocities are evident from the graph of FIG. 4 where it is seen that the outer seal 70-to-roller cage 62 contact velocity 90 and the inner seal 80-to-shaft 12 contact velocity 92 are both less than the seal contact velocity 52 of FIG. 2 for the same shaft surface velocity.

FIG. 5 provides a graphical representation of various component part tangential velocities as a function of shaft and bearing component radii. In the graph of FIG. 5, the tangential velocity of the rotating shaft 12 is represented by the line G-A. The value of the tangential velocity is determined by the following equation 1:

$$V_{shaft} = \pi D_{shaft} N_{shaft}/12$$

Since the bearing inner race 24 is rotating with the shaft 12, the roller surface of the inner race and the point on the rollers in contact with the roller surface represented by line H-B have a tangential velocity represented by equation 2:

$$V_{inner\ race} = V_{inner\ roller} = \pi(D_{shaft} + 2T_{inner\ race})N_{shaft}/12$$

where: $T_{inner\ race}$ = Thickness of the inner race in inches (In)

Moreover, since the rollers 20 are rolling without slippage on the inner surface of the outer race 22 which is mounted rigidly to the wall 16, the instantaneous tangential velocity of the rollers is "0" as is represented by point C on the graph of FIG. 5.

By the principle of similar triangles, the tangential velocity of the center of the rollers 20 and the tangential velocity of the roller cage 62 at the same radius from the center of the shaft 12 is represented by the line J-D determined by the value of equation 3:

$$V_{roller\ center} = V_{roller\ cage} = V_{inner\ race}/2$$

The orbit speed of the rollers 12 and rotational speed of the cage 62 ($N_{roller\ center}$) are determined by the following equations 4 and 5.

$$N_{roller/cage} = 12V_{roller\ center}/[\pi(D_{shaft} + 2T_{inner\ race} + D_{roller})]$$

or, substituting from eq. 3 and eq. 4 for $V_{roller\ center}$ and $V_{inner\ space}$:

$$N_{roller/cage} = N_{shaft}(D_{shaft} + 2T_{inner\ race})/[2(D_{shaft} + 2T_{inner\ race} + D_{roller})]$$

Since the inner seal 80 is rotating with the roller cage 62, the tangential velocity of a point on the inner seal at the seal-to-shaft 12 contact line 42 is provided by equation 6:

$$V_{seal\ c.p.} = \pi D_{shaft} N_{roller/cage}/12$$

The tangential velocity of the seal contact point 40 on the shaft is determined by equation 7:

$$V_{shaft\ c.p.} = \pi D_{shaft} N_{shaft}/12$$

Consequently, the inner seal 80-to-shaft 12 contact velocity is therefore represented by equations 8 and 9:

$$V_{inner\ seal/shaft} = \pi D_{shaft}(N_{shaft} - N_{roller/cage})/12$$

or substituting:

$$V_{inner\ seal/shaft} = (\pi D_{shaft} N_{shaft}/12)\{1 - (D_{shaft} + 2T_{inner\ race})/[2(D_{shaft} + 2T_{inner\ race} + D_{roller})]\}$$

Substituting in the equation 8, it is seen that the outer seal 70-to-roller cage 62 contact velocity is the tangential velocity of the outer surface 64 of the roller rage since the outer seal is stationary. The outer seal to roller cage contact velocity is, therefore, determined by the equation 10:

$$V_{outer\ seal/cage} = \pi D_{cage\ outer} N_{roller\ cage}/12$$

or substituting:

$$V_{outer\ seal/cage} = \pi D_{cage\ outer}\{N_{shaft}(D_{shaft} + 2T_{inner\ race})/2(D_{shaft} + 2T_{inner\ race} + D_{roller})]\}/12$$

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

In comparing the prior art, single seal 32 arrangement of FIG. 1 to the double seal arrangement 60 of FIGS. 2–5, it is seen that for the same shaft diameter, contact velocity can be substantially reduced, thus improving the effectiveness of shaft contact seals.

As an example consider a shaft 12 and bearing 18, sealed by a seal manufactured by Federal Mogul, with the shaft and bearing having the following parameters:

Example $D_{shaft}$ = 1.0 inch; $N_{shaft}$ = 19,000 RPM; $T_{inner\ race}$ = 0.050 Inch;

$D_{roller}$ = 0.25 Inch, and $D_{cage\ outer}$ = 1.40 Inch

When the above values are substituted into equation 1, the sealed contact velocity, V seal/shaft, equals 4,974 feet per minute (FPM) which exceeds the maximum for a Federal Mogul seal of 3,000 FPM by 1,974 FPM. Accordingly, the risk that the seal 32 of FIG. 1 might fail or be compromised is relatively large in that it exceeds the Federal Mogul seal maximum by about 66%.

When the parameters for the shaft 12 and race 18 are substituted into equations 9 and 10 for the inner seal 80-to-shaft 12 and outer seal 70-to-bearing roller cage 62 contact velocities of the FIG. 2 arrangement, the following velocities result:

$V_{inner\ seal/shaft}$ = 2948 FPM $V_{outer\ seal/cage}$ = 2837 FPM

In both cases, the seal contact velocity is less than the 3000

FPM maximum for Federal Mogul seals. It is seen for the sealing system 60 of FIGS. 2–5 that the inner and outer seal contact velocities are reduced to 59% and 57%, respectively, of the contact velocity of a traditional, prior art seal, 18 of FIG. 1 on the same shaft 12 running at the same rotational speed.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a shaft seal system including a shaft, a bearing having an inner race and an outer race with rolling bearing elements disposed between the inner race and outer race and held in spaced relation with respect to one another by a bearing cage, the improvement comprising:

an outer sealing surface on the bearing cage;

an outer seal having an outer end fixed with respect to both the shaft and the bearing cage, the outer seal having a sealing surface in contact with the sealing surface of the bearing cage; and an inner seal having an outer end fixed to the bearing cage for rotation therewith and a sealing surface for sealing with the surface of the rotating shaft, wherein the contact velocity between the sealing surface of the outer seal and the shaft and the contact velocity between the inner seal and bearing cage are less than a preselected standard velocity for seals used to seal rotating shafts.

2. The improvement of claim 1, wherein the sealing surface of the bearing cage projects axially from the rolling bearing.

3. The improvement of claim 1, wherein the rolling bearings are roller bearings.

4. The improvement of claim 1, wherein the rolling bearings are ball bearings.

5. The improvement of claim 1, wherein the rolling bearings are tapered bearings.

6. The improvement of claim 1, wherein the bearing cage projects from the bearing to provide the outer sealing surface.

7. The improvement of claim 1, wherein the bearing is lubricated by a bearing lubricant and wherein the seal prevents a second liquid disposed outside of the shaft seal system from mixing with the bearing lubricant.

8. The improvement of claim 7, wherein the second liquid is a liquid coolant.

9. The improvement of claim 7, wherein the rolling bearings are ball bearings.

10. The improvement of claim 7, wherein the rolling bearings are tapered bearings.

11. In a sealing system for a rotating shaft mounted in a bearing having rolling bearings, wherein the rolling bearing has a bearing cage which rotates as the shaft rotates and as the rolling bearings revolve with respect to a support mounting the shaft and bearing, the improvement comprising:

an outer seal fixed to the support and in rotating sealing engagement with the bearing cage; and an inner seal fixed to the bearing cage for rotation therewith in rotating sealing engagement with the shaft.

12. The improvement of claim 11, wherein the rolling bearings are roller bearings.

13. The improvement of claim 11, wherein the cage projects axially from the rolling bearings to provide a sealing surface for engagement by the outer seal.

* * * * *